(12) United States Patent
Lin et al.

(10) Patent No.: US 7,518,432 B2
(45) Date of Patent: Apr. 14, 2009

(54) LOW NOISE MULTIPHASE CHARGE PUMP AND CONTROL METHOD THEREOF

(75) Inventors: Shui-Mu Lin, Taichung (TW); Nien-Hui Kung, Toufen Township, Miaoli County (TW); Jien-Sheng Chen, Toufen Township, Miaoli County (TW); Tsung-Wei Huang, Jubei (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 11/643,851

(22) Filed: Dec. 22, 2006

(65) Prior Publication Data

US 2007/0152737 A1    Jul. 5, 2007

(30) Foreign Application Priority Data

Jan. 2, 2006    (TW) ............................... 95100106 A

(51) Int. Cl.
*G05F 1/10*    (2006.01)
(52) U.S. Cl. .......................................... 327/536; 363/59
(58) Field of Classification Search .................. None
See application file for complete search history.

(56) References Cited

U.S. PATENT DOCUMENTS

| | | | |
|---|---|---|---|
| 5,262,934 A * | 11/1993 | Price ............................ | 363/60 |
| 6,563,235 B1 * | 5/2003 | McIntyre et al. ............. | 307/109 |
| 7,236,046 B2 * | 6/2007 | Georgescu et al. ........... | 327/536 |

* cited by examiner

*Primary Examiner*—An T Luu
(74) *Attorney, Agent, or Firm*—Rosenberg, Klein & Lee

(57) ABSTRACT

A low noise multiphase charge pump comprises a plurality of capacitors and a plurality of switches configured as a network, the switches are so switched that the charge pump operates in at least three phases by turns, and the operational durations and the operational currents of the phases are preferably balanced, so as to reduce the noise of the charge pump.

4 Claims, 6 Drawing Sheets

LOW NOISE MULTIPHASE CHARGE PUMP AND CONTROL METHOD THEREOF

FIELD OF THE INVENTION

The present invention is related generally to switching power supplies, and more particularly, to a charge pump switching power supply with smaller current and voltage ripples.

BACKGROUND OF THE INVENTION

Current electronic circuits often need more than one direct-current (DC) power supply, and therefore various systems are designed for power conversion, for example charge pumps. A conventional charge pump is switched between a charging phase and a discharging phase so as to operate in two phases, i.e., the charging phase and the discharging phase by turns. For example, in a 1.5x mode charge pump as shown in FIG. 1, two capacitors C1 and C2 have a same capacitance C, and the difference between the maximum voltage and the minimum voltage on the capacitors C1 and C2 is $\Delta V1$. This charge pump operates in a charging phase when switches 10, 16 and 22 turn on and the others turn off, in which a charging path 11 is established to charge the serially coupled capacitors C1 and C2. Let the charging time to be T1, therefore the charging current Iin1 is $C \times \Delta V1/T1$. Contrarily, the charge pump operates in a discharging phase when the switches 12, 14, 18 and 20 turn on and the others turn off, in which a discharging path 21 is established to discharge the parallel coupled capacitors C1 and C2. Let the discharging time to be T2, therefore the discharging current Iin2 is $2 \times C \times \Delta V1/T2$. The input current Iin is equal to $(Iin1 \times T1 + Iin2 \times T2)/(T1+T2)$, and the output current Iout will be $2 \times C \times \Delta V1/(T1+T2)$. FIG. 2 shows a relationship between the input current Iin and time. If T1=T2, the charging current Iin1 will be equal to the output current Iout, and the discharging current Iin2 is two times of the output current Iout. In the charging phase T1, Iin=Iin1=Iout; while in the discharging phase T2, Iin=Iin2=2Iout. Hence, this charge pump has huge current ripple. Since the voltage ripple is proportional to the current ripple, the charge pump also has huge voltage ripple, which causes high noise. To improve this problem, U.S. Pat. No. 6,504,422 to Rader et al. proposes a charge pump which is switched by a switching circuit to charge a capacitor and discharge another in two phases, in order to reduce the voltage ripple. However, it still cannot improve the current ripple.

Therefore, it is desired a charge pump and a control method thereof which can improve the current ripple and the voltage ripple to reduce noise.

SUMMARY OF THE INVENTION

An object of the present invention is to provide a control method to reduce the current ripple and the voltage ripple of a charge pump.

Another object of the present invention is to provide a low noise multiphase charge pump.

In a charge pump having a plurality of capacitors and a plurality of switches configured as a network, according to the present invention, the plurality of switches are so switched that the charge pump operates in at least three phases by turns, and preferably, the operational durations of the phases are balanced with each other, and/or the operational currents of the phases are balanced with each other. Therefore, the current ripple and the voltage ripple of the charge pump are reduced, and further, the noise is also reduced.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
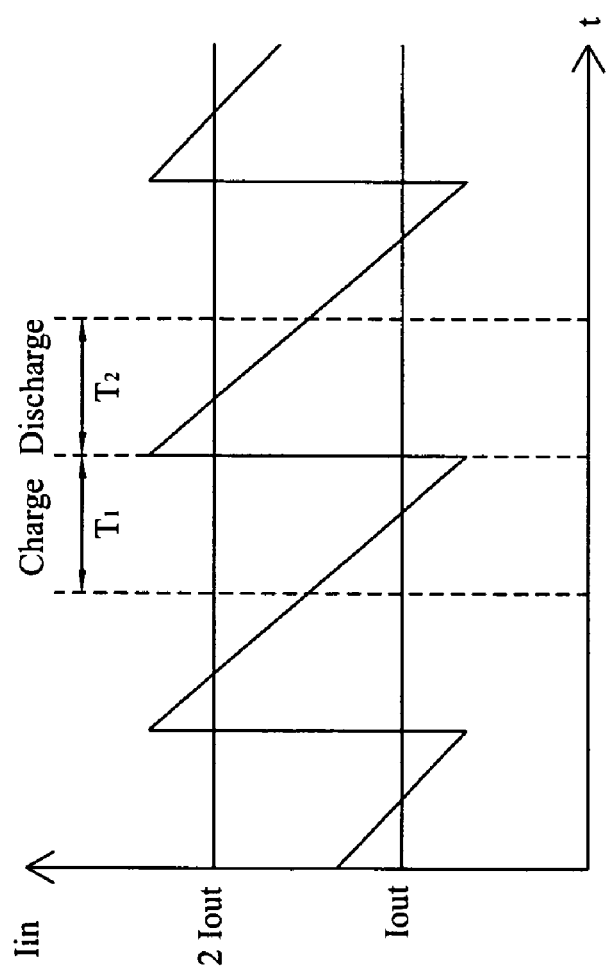
FIG. 2 shows a relationship between the input current of the charge pump shown in FIG. 1 and time.
Figure 3:
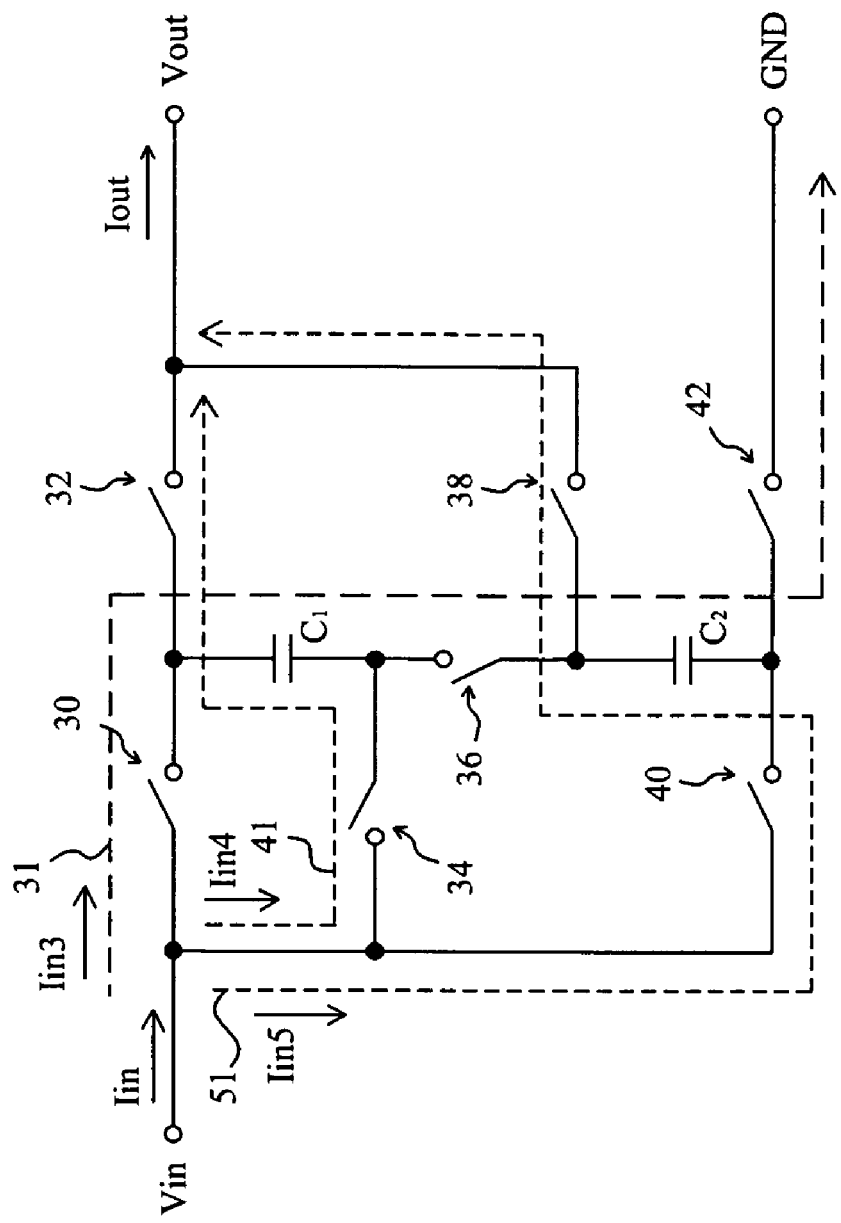
FIG. 3 shows an embodiment according to the prevent invention.
Figure 4:
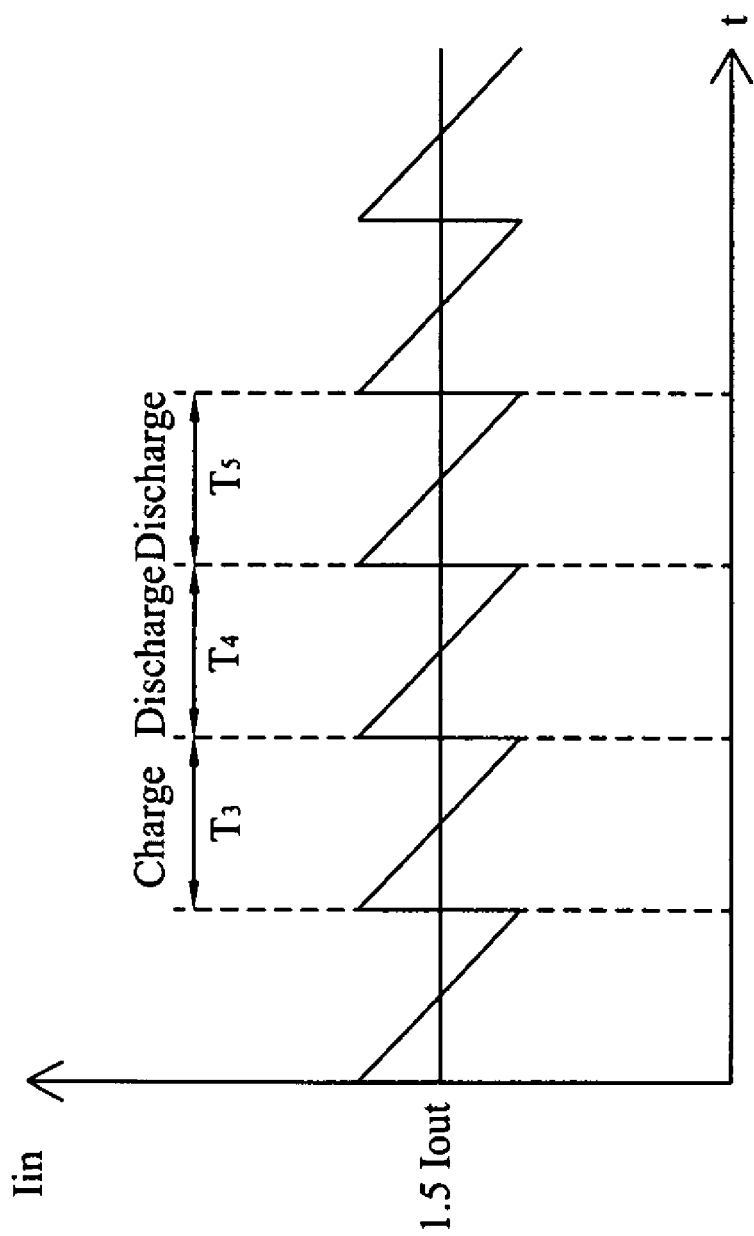
FIG. 4 shows a relationship between the input current of the charge pump shown in FIG. 3 and time.

FIG. 3 shows a 1.5x mode multiphase charge pump according to the present invention, in which two capacitors C1 and C2 have a same capacitance C, and the difference between the maximum voltage and the minimum voltage on the capacitors C1 and C2 is $\Delta V2$. When switches 30, 36 and 42 turn on and the others turn off, a charging path 31 is established and the charge pump operates in a charging phase, by which the capacitors C1 and C2 are coupled in series and charged. Let the charging time to be T3, therefore the charging current Iin3 will be $C \times \Delta V2/T3$. When switches 32 and 34 turn on and the others turn off, a discharging path 41 is established and the charge pump operates in a first discharging phase, by which the capacitor C1 is discharged. Let the discharging time of this phase to be T4, therefore the discharging current Iin4 of this phase will be $C \times \Delta V2/T4$. Then, the charge pump is switched to another discharging phase by turning on the switches 38 and 40 and turning off the others, in which a discharging path 51 is established and the capacitor C2 is discharged. Let the second discharging time is T5, therefore the second discharging current Iin5 will be $C \times \Delta V2/T5$. After the second discharging phase, the charge pump is switched to the charging phase again. The input current Iin=(Iin3×T3+Iin4×T4+Iin5×T5)/(T3+T4+T5), and the output current Iout=$2 \times C \times \Delta V2/(T1+T2+T3)$. FIG. 4 shows a relationship between the input current Iin and time. If T3=T4=T5, the operational currents Iin3, Iin4 and Iin5 are all 1.5 times of the output current Iout. Since the operational currents Iin3, Iin4 and Iin 5 are all the same, i.e., the operational currents of the charge pump in the all phases are balanced with each other, the ripple in the input current Iin is reduced. By comparing the waveforms of FIGS. 2 and 4, it can be seen that the ripple in the input current Iin of FIG. 4 is much smaller than that of FIG. 2, so the voltage ripple is also reduced, and the noise is reduced accordingly.

Figure 1:
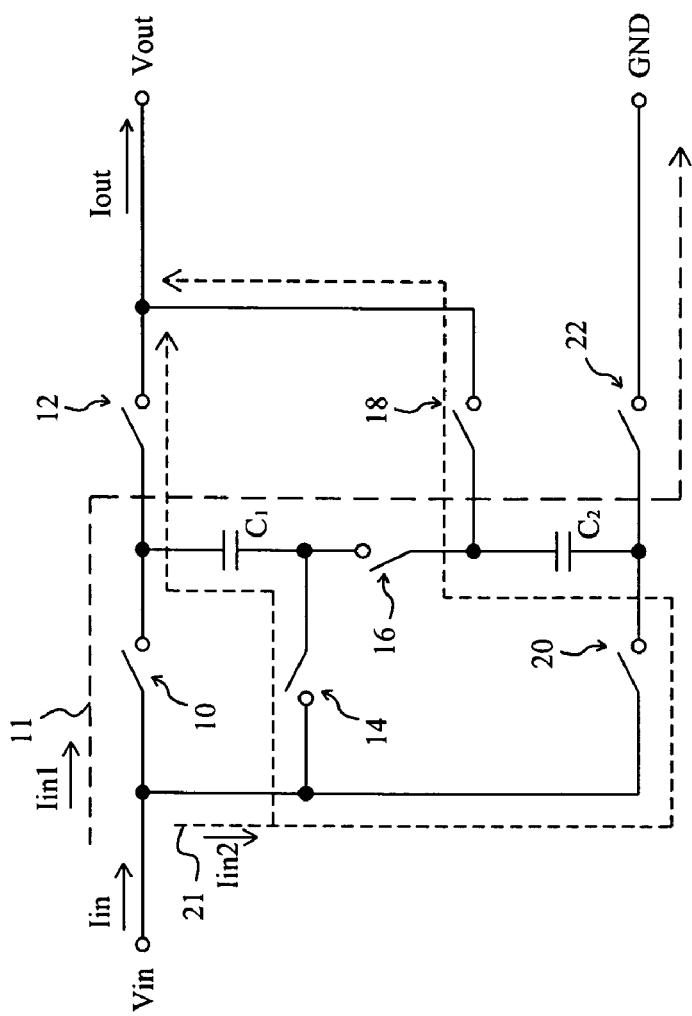
FIG. 1 shows a conventional 1.5x mode charge pump.
Figure 5:
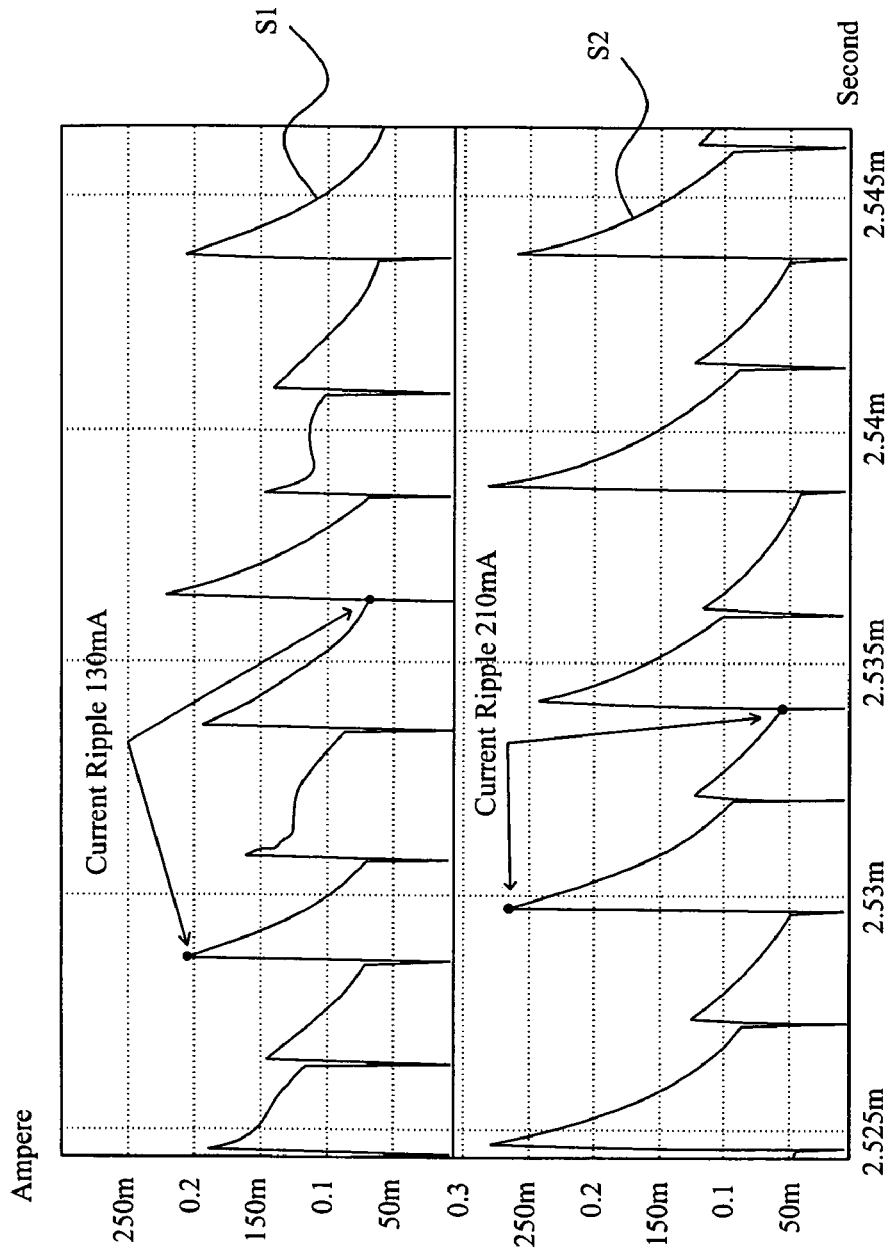
FIG. 5 shows two simulated current-to-time diagrams of the three phase charge pump and the two phase charge pump.
Figure 6:
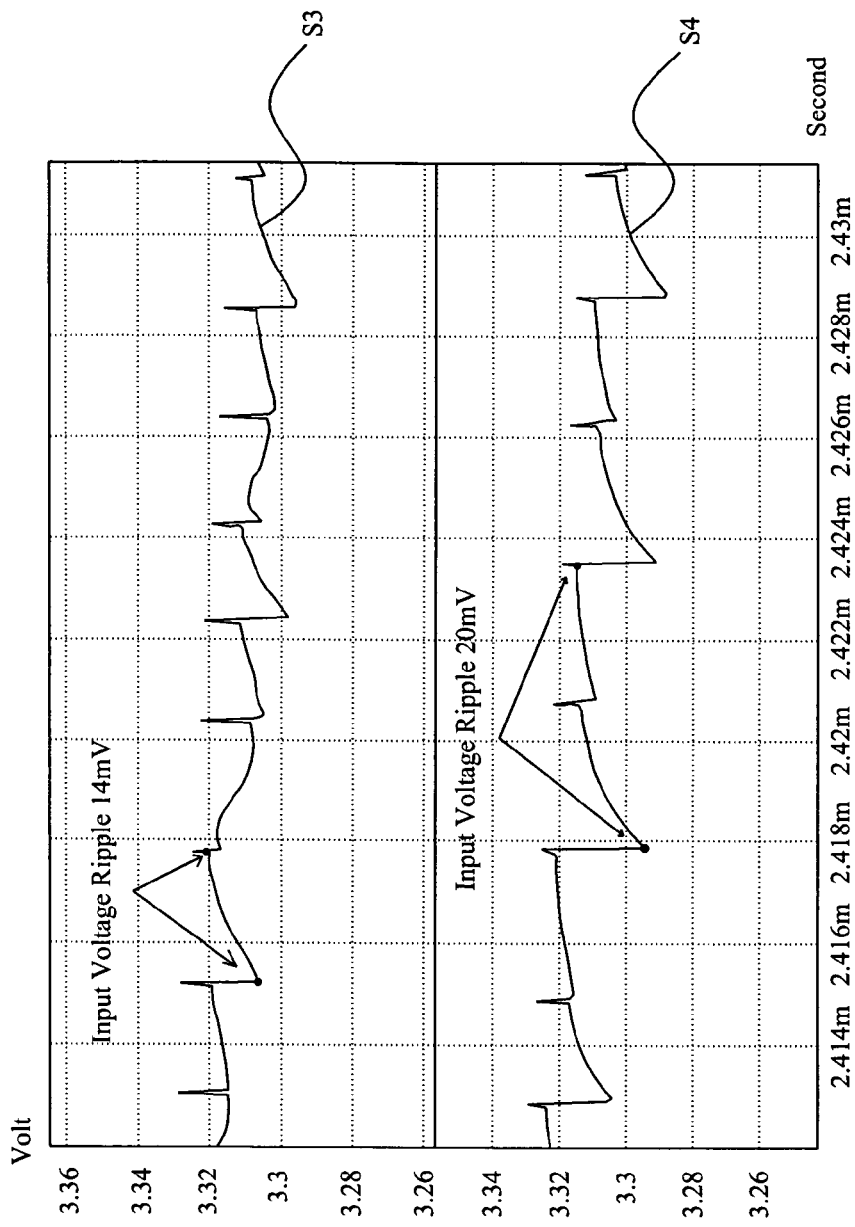
FIG. 6 shows two simulated voltage-to-time diagrams of the three-phase charge pump and the two-phase charge pump.

FIG. 5 shows two simulated current-to-time diagrams of the three-phase charge pump according to the present invention and the conventional two-phase charge pump of FIG. 1. S1 is the operational current of the three phase charge pump according to the present invention, and has a current ripple of 130 mA. S2 is the operational current of the conventional two phase charge pump of FIG. 1, and has a current ripple of 210 mA. It is thus shown that the current ripple of the three-phase charge pump according to the present invention is much smaller than that of the conventional two-phase charge pump of FIG. 1. FIG. 6 shows two simulated voltage-to-time diagrams of the three-phase charge pump according to the present invention and the conventional two-phase charge pump of FIG. 1. S3 is the output voltage of the three-phase charge pump according to the present invention, and has an output voltage ripple of 14 mV. S4 is the output voltage of the conventional two phase charge pump of FIG. 1, and has an output voltage ripple of 20 mV. It is thus shown that the output voltage ripple is improved because of the reduction of the current ripple.

Since the charge pump of the present invention suffers smaller current ripple, it can use smaller switches. Additionally, comparing with the charge pump of U.S. Pat. No. 6,504, 422, the circuit of the present invention is simpler and easier to implement, and requires less switches, thus the resistance of the serially coupled switches is reduced, and hence less energy is consumed, thereby reducing the cost.

In other embodiments, the numbers of the capacitors and the switches can be changed, depending on the specific applications, and the number of the operational phases can be also changed, depending on the requirement of the applications, preferably under balanced operational durations and balanced operational currents between the operational phases of the charge pump.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control method for a low noise multiphase charge pump having a plurality of capacitors and a plurality of switches configured as a network, the control method comprising the steps of:
    switching the plurality of switches for charging or discharging the plurality of capacitors to operate the charge pump in cycles, each cycle including at least three consecutive phrases;
    wherein said at least three consecutive phases include a charging phase followed by two discharging phases, wherein said at least three consecutive phases are switched to have balanced substantially equal operational durations thereof.

2. The control method of claim 1, wherein the at least three phases have balanced operational currents therebetween.

3. A low noise multiphase charge pump comprising:
    an input for connecting with an input voltage;
    an output for providing an output voltage;
    a ground node for connecting with a reference voltage; and
    a plurality of capacitors and a plurality of switches configured as a network connected to the input, the output and the ground node;
    wherein the plurality of switches are switched in order to charge or discharge the plurality of capacitors to operate the charge pump in cycles, each cycle including at least three consecutive phases, each of the at least three consecutive phases including a charging phase followed by two discharging phases, wherein said at least three consecutive phases are switched to have balanced substantially equal operational durations thereof.

4. The charge pump of claim 3, wherein the at least three phases have balanced operational currents therebetween.

* * * * *